Feb. 3, 1970 C. S. HICKLE 3,493,794
METHOD OF MANUFACTURE OF ELECTRIC MOTOR
AND ELECTRIC MOTOR STATOR CONSTRUCTION
Filed Feb. 28, 1968

INVENTOR.
CLYDE S. HICKLE
BY
Watts, Hoffmann, Fisher & Heinke
ATTORNEYS

United States Patent Office 3,493,794
Patented Feb. 3, 1970

3,493,794
METHOD OF MANUFACTURE OF ELECTRIC MOTOR AND ELECTRIC MOTOR STATOR CONSTRUCTION
Clyde S. Hickle, Columbus, Ohio, assignor to Ranco Incorporated, Columbus, Ohio, a corporation of Ohio
Filed Feb. 28, 1968, Ser. No. 708,949
Int. Cl. H02k *15/02*
U.S. Cl. 310—42    8 Claims

ABSTRACT OF THE DISCLOSURE

The laminated stator of an electric motor is clamped to a frame, from which the rotor of the motor projects into the stator bore, by bolts extending through aligned openings in the stator plates and threaded into the frame. To assure a proper and uniform air gap between the rotor and the walls of the stator bore, the stator is formed by stacking individual stator plates with the bore openings in alignment, and without permanently bonding the individual plates together the motor windings are installed in axially extending slots in the stator, then while the individual stator plates are free to shift laterally of the axis of the bore, the inside walls of the stator are spaced from the rotor by a spacer device to establish a predetermined air gap between the rotor and stator, the stator plates are then firmly bolted to the frame by bolts extended through aligned apertures in the stator laminations, the diameters of the bolts and the apertures being such that limited shifting of the plates is permitted until the bolts are drawn to clamp the plates together and to the frame.

---

The present invention relates to electric motors and a method of manufacture thereof.

Heretofore it has been the practice to assemble certain types of electric motors, such as motors for driving hermetically sealed refrigerator compressors, by forming a stator of a series of annealed and surface-blued stator plates stacked together to form a laminated body, after which the stators were welded or otherwise permanently bonded to one another to form a rigid, solid body or core. The motor field windings were then installed in axially extending slts in the wall of the bore of the stator. This stator was then attached as by bolts to the frame for the motor with one end of the stator abutting pads or suitable mounting surfaces on the frame and with the bore receiving the rotor attached to a shaft journaled in the frame or associated structure and presumably projecting at 90° from the plane of the pad or mounting surfaces. It is necessary that the stator bore walls and the rotor be concentric so as to provide a uniform air gap between the two parts; otherwise the motor will be inefficient and have unacceptable operating characteristics. Considerable difficulties arise in establishing this concentricity from one or a number of factors, all of which are difficult to control. For example, the rotor shaft may not be journaled to extend exactly 90° or square with the plane of the pad surfaces, or the face of the laminated stator abutting the pads may not be normal or square with the axis of the stator bore due to inaccuracies in forming the various components of the motor. These factors mentioned call for considerable care and working in the assembly and testing of the assembled motors to provide satisfactory results.

A principal object of the present invention is the provision of a new and improved method of manufacturing electric motors of the type mentioned in which a high degree of accuracy in providing concentricity of the stator bore and rotor may be achieved with a minimum of skill, labor and work.

According to the present invention, the stator is first assembled by stacking conventional stator plates, which may have been annealed and surface-blued, in the form of a stator and then inserting the insulators and the motor field coils into the winding slots of the stator in any suitable well-known manner while the stator plates are held in the form of the stator but without bonding the stator plates with one another so that the plates may slide laterally of the stator bore and relative to one another when released from compressive pressures. One end face of the stator thus far assembled is then placed against a support surface of a conventional motor frame, for example, with the rotor received in the stator bore, after which a suitable spacer, such as an expanding mandrel, is then inserted between the stator bore walls and the rotor. The stator plates, having no heavy compressive forces thereon may then shift laterally of the rotor, if necessary, to accommodate the mandrel so that the walls of the bore are concentric with the rotor as determined by the mandrel. The stator plates are then compressed together and secured to the frame by suitable means, such as bolts extending through a plurality of apertures in the stator plates which are slightly larger than the diameter of the bolts proper so that the bolts firmly clamp the stator laminations together and to the base surface with the plates disposed to provide the desired concentricity of the stator and rotor and in the form of a rigid and durable unit. Preferably, the stator is initially held to the motor frame for the air gap spacing operation by the bolts threaded into the frame without application of appreciable compression force to the plates. By permitting the stator plates to shift laterally to properly space the rotor and the walls of the stator bore by the mandrel or a like gauge, the axis of the bore may be established at an angle to the plane of the stator support surface of the frame appropriate to providing a uniform air gap between the rotor and stator. Thus, the invention provides for proper alignment of the stator and rotor with a minimum of work, labor and time.

A further object of the invention is the provision of a new and improved stator for an electric motor, which stator includes field windings and a body which may flex laterally relative to one end thereof and which may be fixed to a frame for the motor so that the axis of the bore may be aligned with the axis of a rotor extending from the stator support frame and into the bore.

Other objects and advantages of the invention will be apparent from the following description of a preferred embodiment of the invention, reference being made to the accompanying drawings wherein.

Figure 1:
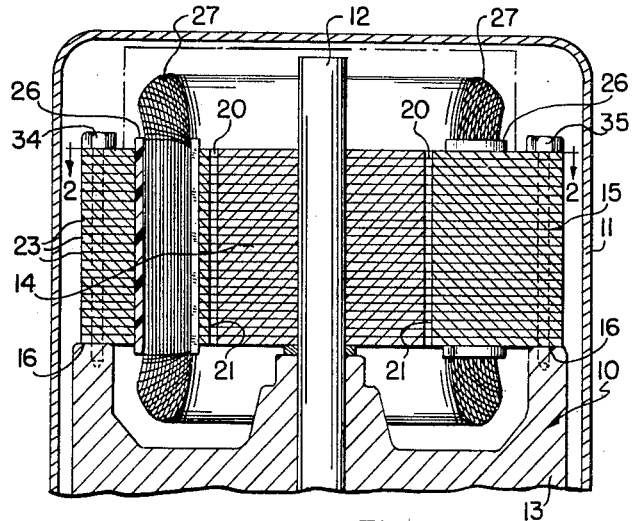
FIG. 1 is a fragmentary sectional view of an electric motor driven compressor for a hermetically sealed refrigeration system, which motor is made in accordance with the invention.
Figure 2:
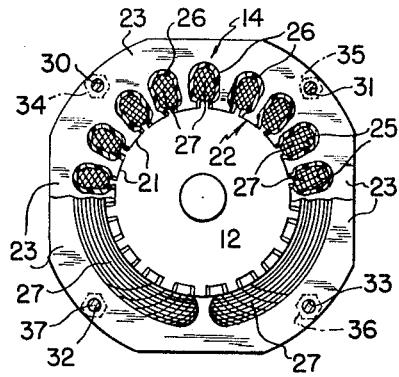
FIG. 2 is an end elevational view, partly in section, of the stator of the motor shown in FIG. 1 prior to its assembly into the motor.
Figure 3:
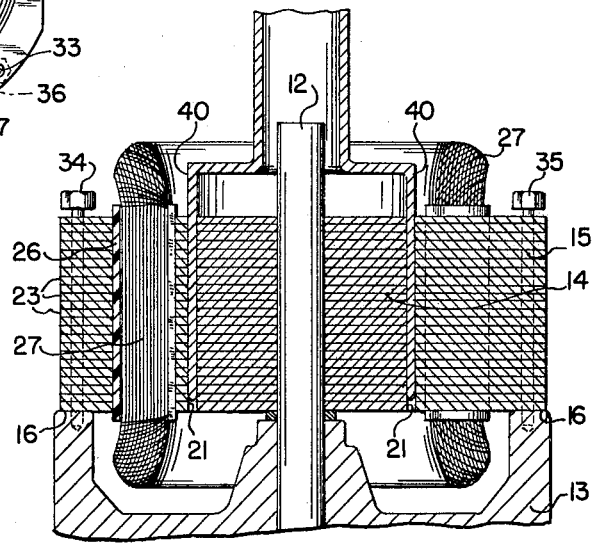
FIG. 3 is a view similar to that of FIG. 1, but showing parts of the motor during assembly of the motor to the compressor.

Referring to FIG. 1, a refrigerant compressor 10 is shown in part and includes a hermetically sealed shell 11 which encloses a refrigerant compressor or pump, not shown, driven by a crankshaft 12, a portion of which projects from an internal frame member 13 of the compressor and has a rotor member 14 attached to the extended end and forms the rotor of the motor. This construction is well known in the art and it is understood that the rotor 14 is driven by the magnetic field produced in a stator 15, one end of which is secured to a support surface or base comprising four pads 16 (only two of which are shown) formed on the frame member 13 and spaced at 90° to one another. The surfaces of the pads 16 engaged by the stator 15 are accurately machined to lie in a common plane, which ideally, is normal to the axis of the shaft 12. A predetermined uniform space or air gap 20 is provided between the cylindrical surface of the rotor 14 and the walls 21 of the bore 22 of the stator 15, all of which is well known in the electric motor art.

In carrying out the invention, the stator 15 is formed by providing a number of identical iron plates 23 and stacking a given number of the plates 23 to form a stator of proper height. The plates 23 may be annealed or rust-proofed, if desired, prior to assembly into a stator. Each plate 23 is generally rectangular and has rounded corners and a central circular opening 22 which forms a short segment of the bore wall 21 when the plates are stacked in alignment. Also, each plate 23 has a series of radial slots 25 formed therein and which open into the bore 22. When the plates 23 are stacked in proper alignment to form the stator, the slots 25 are in alignment and form axially extending slots in the walls 21 of the bore to receive insulators 26 and field windings 27 as in conventional. Each plate 23 has four apertures 30, 31, 32, 33 adjacent the four corners and when the plates form the stator the apertures provide tubular passages for receiving four bolts 34, 35, 36, 37 which extend from one end of the stator to the other and secure the stator to the pads 16. The diameters of the apertures 30–33 are slightly greater than the diameters of the bolts 34–37 so that a limited lateral shifting of the plates relative to one another may occur while the bolts extend through the apertures.

The stator plates 23 may be temporarily held together in the stacked alignment mentioned by a suitable fixture (not shown) which compresses the stator plates together and may embrace the outer sides of the plates. The insulators 26 and windings 27 may then be inserted and fixed in the slots in any suitable manner, either manually or by machines used for this purpose, which practices are well known in the art. Generally, the windings may be tied in place, as is the usual practice. The installed insulators 26 and windings 27 are effective to retain the stator plates 23 in their stacked and generally aligned positions so that the stator thus far assembled may be released from the fixture and the stator then transferred to an assembly site for the motor. If desired, suitable clips not shown, could be employed to assist in holding the stator plates 23 in their stacked alignment for handling of the stators to prevent possible damage to the windings, etc.

In the assembly of the motor, the stator 15 with the windings thereon is placed over the rotor 14 with one end face of the stator body resting on the surfaces of the pads 16 and the rotor extending inside the bore. The pads 16 each has a threaded opening for receiving the bolts 34–37, and these threaded openings are located in axial alignment with the respective apertures 30–33 through the stator plates.

The bolts 34–37 are then inserted through the respective passages formed by the apertures 30–33 and partially threaded into the openings in the pads 16 so that the stator is held to the frame but is not appreciably compressed endwise by the bolts. The walls of the bore 21 are then uniformly spaced from the shaft and rotor 14 by suitable means, such as an expandable tubular mandrel 40 which is inserted over the end of the crankshaft 12 and between the rotor and the walls of the bore. The walls of the mandrel 40 function to provide a uniform spacing between the walls 21 of the bore and the rotor 14 to provide precise concentricity between these parts and consequently a uniform air gap. In the event that the axis of the bore 22 is not exactly coincident with the axis of the rotor 14 when the mandrel 40 is employed as described, the fact that the individual assembled stator plates may slide relative to one another permits the plates to shift and cause the axis of the stator 22 to assume concentricity with the axis of the rotor according to the spacing effected by the mandrel. The bolts 34–37 are then threaded into the pad to draw their heads against the outer plate 23 and clamp the stacked stator plates firmly to one another and to the pads thereby forming a rigid stator body attached to the motor frame formed by the compressor wall structure 13. The mandrel is then removed from the stator base.

It is contemplated that the rotor member 14 which is applied to the shaft 12 could be omitted until after the stator has been assembled to the frame member 13, in which event a mandrel or suitable spacer would be positioned between the shaft 12 and the stator bore walls prior to having the securing bolts 34–37 tight. The term "rotor" as used in the claims should be construed to include the end portion of the shaft 12 to which the rotor member 14 is attached.

It will be appreciated that the method of manufacture of the electric motor as described eliminates costly labor, assembly and inspection operations and yet provides uniform air gap spacing between the rotor and stator which results in a relatively inexpensive and yet highly efficient motor.

Although but one form of the invention has been shown and described, other forms, modifications and adaptations thereof may be made, all falling within the scope of the claims which follow.

I claim:

1. The method of assembling the stator and rotor of an electric motor which comprises the steps of providing a frame means rotatably supporting the rotor of said motor on an axis extending substantially normal to a stator support surface on said frame, a plurality of stator plates adapted to be stacked to form a stator body having a bore for receiving the rotor and in which said plates may slide relative to one another, applying motor windings to said stator body, placing one end face of said stator body against said support surface of said frame and with said rotor in said bore shifting individual ones of said stator plates laterally relative to said rotor while said end face of said stator is engaged with said support surface to establish concentricity between said rotor and the walls of said bore, and then securing said stator plates to one another and to said frame.

2. The method set forth in claim 1 in which said plates are secured to one another by bolts threaded into said frame means and bearing against the end plate of said stator remote from said support surface.

3. The method set forth in claim 2 in which said plates are each provided with apertures which are aligned with corresponding apertures in the other of said plates when said plates are aligned concentric with said rotor, the diameters of said bolts being less than the diameters of said apertures.

4. The method set forth in claim 3 in which said stator is in engagement with said support surface while said bolts extend through said apertures and threadingly engage said frame but which bolts exert insufficient pressure endwise on said stack of stator plates to prevent said lateral shifting of said plates, and then tightening said bolts against said outer end plate of said stator to clamp said stator to said frame with a force to prevent lateral displacement of said plates.

5. The method set forth in claim 1 in which spacer means is inserted between said rotor and the walls of said stator bore to cause said shifting of said stator plates.

6. The method set forth in claim 5 in which said spacer means is a hollow cylindrical member, the cylindrical walls of which are inserted between the rotor and the stator walls.

7. The steps of forming an electric motor which includes forming individual stator plates adapted to be stacked to form a laminated stator, stacking said plates to form a stator body, and applying motor windings to said stacked stator plates while said plates are in condition to be rendered slidable relative to one another.

8. A stator for assembly in an electric motor frame, said stator comprising a plurality of substantially identical stator plates stacked to form a stator body having a bore for receiving a rotor and axially extending radial slots opening into said bore, and wire windings in said slots, said plates being shiftable relative to one another in a direction laterally of the axis of said bore, said windings maintaining said plates in said stack form while permitting limited lateral shifting of one plate relative to another.

References Cited

UNITED STATES PATENTS

| | | | |
|---|---|---|---|
| 1,403,179 | 1/1922 | Marschke | 310—217 X |
| 2,478,706 | 8/1949 | Peters | 310—88 X |
| 2,792,512 | 5/1957 | Koch | 310—258 |
| 3,299,304 | 1/1967 | Hull | 310—217 |
| 3,408,734 | 11/1968 | Leahy | 29—596 |

WARREN E. RAY, Primary Examiner

U.S. Cl. X.R.

29—596; 310—217, 259